Jan. 29, 1963 J. G. SPRACKLEN 3,076,142

REMOTE CONTROL APPARATUS

Filed Jan. 28, 1959

INVENTOR
John G. Spracklen

BY James J. Jennings, Jr.
ATTORNEY 3,076,142
Patented Jan. 29, 1963

3,076,142

REMOTE CONTROL APPARATUS

John G. Spracklen, Chicago, Ill., assignor to Zenith Radio Corporation, a corporation of Delaware Filed Jan. 28, 1959, Ser. No. 789,660
1 Claim. (Cl. 325—392)

Figure 1:
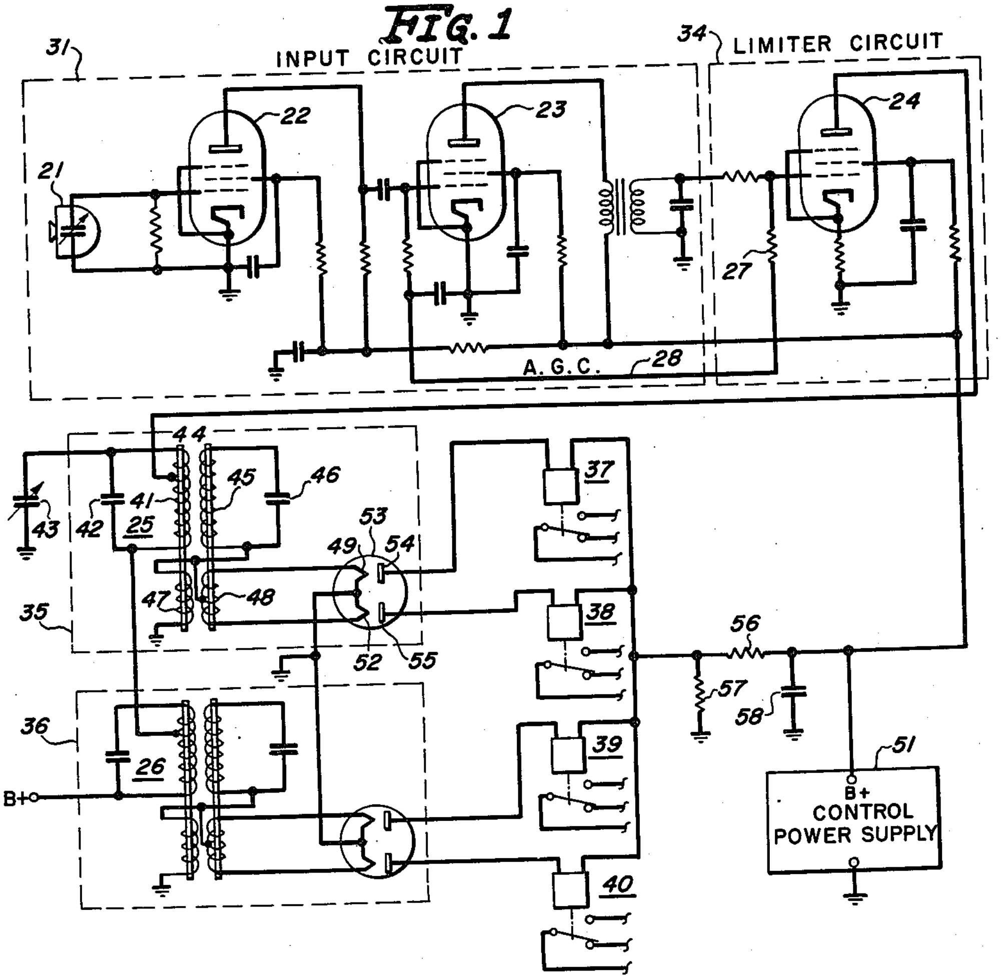

This invention is directed to remote control apparatus and more particularly to such apparatus designed to respond to a desired signal and to discriminate against noise and other unwanted signals. The system is particularly valuable when applied to control one or more of the electrical circuits in wave-signal receiver, such as a television receiver. Accordingly, the invention is described in that connection; it is not, however, restricted to that particular use but may be employed to control apparatus in a variety of applications. The invention is an improvement of the basic control system described and claimed in United States Patent No. 2,817,025, issued to Robert Adler on December 17, 1957, entitled "Control System," and assigned to the assignee of the present invention.

There are many different types of electrical or electrically-controlled apparatus for which convenience and efficiency of operation may be greatly enhanced by a remote control system. For example, a television receiver is best utilized when the observer is seated at a substantial distance from the receiver, thus making it relatively inconvenient to change the station or signal channel to which the receiver is tuned when a change in programs is desired, to change the amplitude of sound from the receiver, to turn the receiver on and off, etc. Accordingly, it is highly desirable to provide a system to regulate the receiver operation without requiring the observer to leave the normal viewing position. Similarly, it is frequenty desirable to provide for remote control of doors, as on a garage, of heating apparatus, such as a furnace, and of other similar electrical or electrically-controlled devices. In many of these applications, it is undesirable to have a direct cable connection from the remote control station to the controlled device, since a wire or cable link is not particularly attractive in appearance and may often cause accidents when extended transversely of an area where people commonly walk.

Remote control systems in which operating characteristics of a radio or television receiver or other device are varied in response to radio, acoustic, or light signals have been employed in the past. Those systems which utilize a portable miniature radio transmitter have generally been unsatisfactory in that the control system may be triggered to change the operating characteristics of the controlled device by signals emanating from sources other than the control transmitter. Radio-linked remote control systems frequently create objectionable interference in other wave-signal receivers; they also tend to be relatively complex and expensive to manufacture and require batteries or some other source of electrical power at the transmitter.

Light impulse actuated systems are generally effective in operation, but frequently are relatively expensive, particularly where a number of different electrical circuits are to be controlled, since the photo-sensitive devices employed at the receiving station of the system are relatively costly in themselves and are required to be included in mutually exclusive channels in the control chassis. Systems of this type are also sometimes subject to false actuation under adverse ambient lighting conditions.

Acoustic control systems, using signals in both the audible and ultrasonic ranges, have been proposed many times but have not found general acceptance in the past. This lack of acceptance is generally attributable to the fact that the amplitude of the signal received at the pick-up station of the system varies inversely as the square of the distance between the transmitting and pick-up stations. This factor tends to make a control system based upon amplitude modulation of an acoustic carrier-wave quite erratic in operation. In addition, systems of this type are quite frequently subject to false triggering from extraneous acoustic signals.

These and other disadvantages of prior art systems have been effectively overcome by the system described and claimed in the aforesaid patent. Other portions or aspects of the same system are disclosed and claimed in Patent Nos. 2,821,954; 2,821,955; 2,821,956 and 2,838,668, all assigned to the assignee of this invention. This system has already achieved noteworthy commercial success.

One embodiment of the system shown in Patent No. 2,817,025 includes, in the control chassis, a pair of frequency discrimination devices which have their output elements coupled through integration networks to different utilization means or controlled relays. The use of such discriminators facilitates simplification of the control chassis in that various command signals may share common signal stages, for instance amplification and limiting, and yet be separated from one another as required for each command to accomplish an assigned one of several controlled functions. The signals from the discrimination devices are integrated before performing their individual control functions to minimize the possibility of spurious actuation of the control system by undesired noise or other transient signals. The integration networks there shown employ a number of circuit components to effect proper discrimination against unwanted signals. Although such networks substantially enhance the reliability of operation, the cost of the system is inevitably increased by the inclusion of these components. It is highly desirable to retain this operating reliability and at the same time achieve economies in the structure.

It is an object of the present invention, therefore, to provide a remote control system with high discrimination against unwanted signals and which is more economical than known systems.

It is a further object to produce such a system which utilizes fewer components than do known systems and yet preserves the desirable reliability or freedom from spurious actuation.

A remote control apparatus, constructed in accordance with the invention, responds to an unmodulated control signal of a predetermined frequency which is translated from a remote point and which is subject to being received along with undesired noise signals. The remote control apparatus comprises a receiver channel including a circuit receptive of the control signals and a limiter responsive to the received control signals to restrict the translated amplitude thereof to a preselected maximum value. A frequency selective circuit is provided which is responsive only to signals of the predetermined frequency. The invention further provides a diode having a filamentary cathode which is energized only by the amplitude limited frequency-selected signals translated by the limiter and above circuits. The diode has a cathode emission characteristic responsive to the application to the cathode of an input signal of both a given minimum amplitude which is less than the preselected maximum value and a predetermined minimum time duration to develop a current flow of more than a predetermined magnitude. A utilization circuit is coupled to the anode of the diode and is responsive only to current of the anode in excess of the predetermined magnitude.

Figure 3:
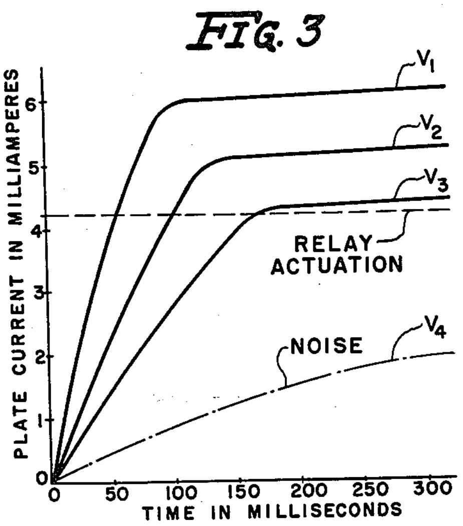
Figure 2:
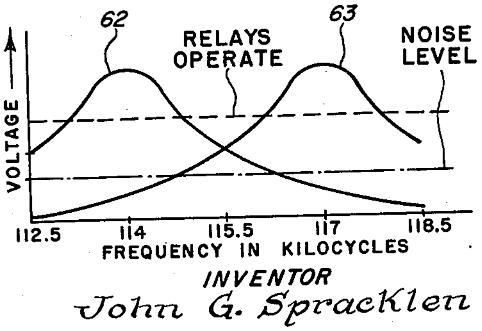

The features of this invention which are believed to be novel are set forth with particularity in the appended claim. The invention, together with further objects and advantages thereof, may best be understood, however, by reference to the following description taken in conjunction with the accompanying drawing, in the several figures of which like reference numerals identify like elements, and in which:

FIGURE 1 is a schematic diagram illustrating an embodiment of the invention; and FIGURES 2 and 3 are graphical illustrations useful in understanding the operation of the invention.

In the embodiment of the present invention illustrated in FIGURE 1, major assemblies are indicated by the same reference numerals as are utilized in FIGURE 2 of Patent No. 2,817,025 to indicate the correlation of the present invention with the system there disclosed and claimed. Specifically, the input circuit is again designated by reference numeral 31, the limiter circuit is indicated by reference numeral 34, the segregation networks, although radically different in accordance with the present invention, are still designated by reference numerals 35 and 36, the operating relays are indicated by reference numerals 37–40 inclusive, and the control power supply is again denominated by reference numeral 51.

The operation of input circuit 31 and limiter circuit 34 have been set forth at length in Patent No. 2,817,025. It is sufficient here to note that an acoustic signal impinging upon microphone 21 is translated into an electrical signal, amplified in the first and second amplifiers 22 and 23, amplitude limited in limiter 34 which includes an electron-discharge device 24, and the resultant signal is applied to the series arrangement of parallel-resonant circuits 25 and 26. The automatic gain control (AGC) circuit including resistor 27 and conductor 28, which prevents strong signals from overdriving limiter stage 34, is not shown or described in the previous patents, but its structure and operation are readily apparent to those skilled in the art. Because segregation networks 35 and 36 differ substantially from the segregation networks shown in the aforementioned patents, both the structure and the operation of these assemblies will be described in detail.

Considering the structure of segregation network 35, resonant circuit 25 includes the primary winding 41 of a transformer 44 parallel-coupled with a capacitor 42. Additionally, a variable capacitor 43 is coupled between the upper end of resonant circuit 25 and a point of reference potential, such as ground. It has been found that capacitor 43 facilitates perfecting the circuit balance approached by a compensating coupling reactance contributed by mutual inductance between the primary windings of resonant circuits 25 and 26; the need for this compensation is fully explained in Patent No. 2,838,668. It has been found convenient to overcompensate and then establish precise balance by adjustment of condenser 43.

Primary winding 41 is critically coupled to secondary winding 45 of transformer 44, and a capacitor 46 is connected in parallel with winding 45 to form a resonant circuit tuned to the same frequency as resonant circuit 25. Tertiary windings 47 and 48 are very tightly coupled to primary and secondary windings 41 and 45, respectively. Because of this tight coupling, tertiary windings 47 and 48 have induced in them a potential of the same phase as that appearing instantaneously across windings 41 and 45, respectively, while the potential instantaneously appearing across winding 45 lags that of winding 41 by 90°. It is therefore evident that resonant circuit 25, together with resonant circuit 45, 46 and tightly coupled windings 47 and 48, form a novel frequency discrimination circuit which is the equivalent in operation of known circuits, such as that shown in Patent No. 2,817,025, utilizing a capacitive coupling from one end of the tuned primary winding to the mid-point of the tuned secondary winding of a frequency discriminator network. The described frequency discriminator has proved the most economical and simple structure for effecting an impedance match between the high output impedance of limiter stage 34 and the very low input impedance of a filamentary diode 53, to be described hereinafter, while simultaneously performing the requisite frequency-discrimination function.

Tertiary winding 48 is coupled to the filament sections 49 and 52 of a signal-translating device which in the illustrated embodiment is a filamentary diode 53. Diode 53 has anodes 54 and 55 associated with filament sections 49 and 52 respectively. The input circuit for the upper half of diode 53 includes tertiary winding 47, the upper half of tertiary winding 48, and filament section 49. The corresponding circuit for diode section 52 is generally the same but traverses the lower, rather than the upper, half of winding 48. Accordingly, input stage 31, limiter stage 34 and coupling transformer 44 together comprises means for receiving an input signal and for applying an amplified control signal to the input circuits of both sections of diode 53 to effect selective emission therefrom in a manner to be described in more detail hereinafter.

The anodes 54 and 55 of diode 53 are coupled through the windings of control relays 37 and 38, respectively, and thence through resistor 56 to potential source B+. The output circuit of the upper half of diode 53 includes filament section 49, anode 54, control relay 37, and resistor 57, which is connected between ground and the common connection of control relays 37—40. The output circuit of the remaining section of the diode comprises filament 52, anode 55, relay 38 and resistor 57. The contacts of the control relays may be connected to mute the output sound of a television receiver, to change channels in one or the other direction, to switch the set off and on, or to perform other functions. For example, the contacts of relay 37 can be connected to mute and restore the audio output signal and relay 38 may control ON-OFF in the receiver, all as described in Patent No. 2,817,025. Power supply filter capacitor 58 is connected between ground and the B+ terminal of control power supply 51.

Segregation network 36 includes components physically and electrically similar to those shown in segregation network 35. However, because the operation of control relays 37—40 is effected on a frequency discrimination basis, resonant circuit 26 is tuned to a different frequency than is resonant circuit 25 of segregation network 35.

In operation, it is important to remember that selective actuation of control relays 37—40 is effected by frequency discrimination techniques; there are, in effect, four separate and distinct signal channels in the receiver circuit of FIGURE 1, even though these channels are merged into a single signal path in certain stages. Specifically, the four signal channels share a common path between microphone 21 and limiter stage 34. When the input signal at microphone 21 is of sufficient amplitude that limiter stage 34 effects an amplitude regulation of the control signal appearing at the anode of tube 24, a control signal of reference amplitude is translated from the output side of limiter stage 34 and applied across the series connection of resonant circuits 25 and 26.

Separation of the four signal channels is accomplished in segregation networks 35 and 36. Each of these networks is constructed to respond to only two of the four control frequencies and to effect a separation between the signals of those two frequencies to which it does respond. Accordingly a significant electrical output is obtained from either segregation network 35 or 36 only when a control signal of proper frequency is applied to the tuned input circuit of the particular segregation network.

To illustrate the frequency discrimination by an example, it is assumed that the input signals or commands received at microphone 21 utilize carrier frequencies of 38, 39, 40 and 41 kc. respectively. In practice, it has been found desirable to utilize a frequency separation wider than this one kilocycle to facilitate accurate discrimination between the control frequencies; accordingly, resonant networks 25 and 26 are tuned to the third harmonic of the mid-frequency between two input frequencies.

In other words, since these resonant circuits are connected in cascade in the output of limiter 34, the limiter further serves as a frequency multiplier for the command signals and has a multiplication factor of three. Assuming segregation network 35 is to effect control operations only in response to, and is to discriminate between, signals of 38 and 39 kc., parallel resonant circuit 25 is tuned to 115.5 kc. Correspondingly, resonant circuit 26 is tuned to 121.5 kc. A significant electrical response in the secondary winding of transformer 44 is only effected when a signal of 38 or 39 kc. is received at microphone 21. When the input signal is of 38 kc., the effective electrical output which appears across filament section 49 is the vector sum of the output signals across tertiary winding 47 and the upper half of tertiary winding 48; at this frequency the signal which appears across filament section 52, as a result of the vector sum of the signals across winding 47 and the lower half of winding 48, may be disregarded. In a corresponding manner, an input signal of 39 kc. effects the application of a significant electrical output across filament section 52 of diode 53 but not to filament section 49. This discrimination between two different-frequency control signals by the frequency discriminator including resonant circuit 25, resonant circuit 45, 46 and tertiary windings 47 and 48 is illustrated by the frequency response characteristic shown as separate curves 62 and 63 in FIGURE 2.

Curve 62 illustrates the effective signal applied to filament section 49 as a constant amplitude signal from limiter stage 34 is varied in frequency; curve 63 indicates the signal applied to filament section 52 under the same conditions. At 114 kc. the signal applied to filament section 49 is substantially above the level required to effect operation of the control relay energized through this section of diode 53. At the same frequency, the signal applied to filament section 52 is appreciably less than the level of random atmospheric disturbances and other transient effects. Accordingly, only the one signal channel including diode section 49 produces a significant output signal when an input or command signal of this particular frequency (38 kc.) impinges upon microphone 21. In similar fashion, it may be shown that the only channel to respond effectively to a received command signal of 39 kc. is that including diode section 52. Likewise, command signals of 40 kc. and 41 kc. are accepted by segregation network 36 and are directed respectively and individually, to the channels including the top and bottom sections of the diode which is coupled to resonant circuit 26.

In the absence of a received command signal, the filaments of the filamentary diodes are not at a sufficiently high temperature to emit appreciably but the application of such a signal, if it meets certain minimum requirements of amplitude and duration, results in significant emission; this characteristic is analogous to integration and is relied upon to permit the control system to distinguish between commands and spurious signals, as will be made clear hereinbelow. Moreover, control relays 37–40 are of the type which does not operate until a current of predetermined amount is passed therethrough. Thus, in accordance with the invention, a signal which exceeds a threshold amplitude level and also exceeds a minimum time duration must traverse the filament circuit of any diode section to cause the filament of that diode section first to emit significantly and subsequently to effect the operation of the particular control relay included in its output circuit. The effective filament heating, and consequently its emission, in response to received ultrasonic signals is explained more fully in connection with FIGURE 3.

The curves of this figure represent the increase of plate current, as a function of time, from the instant that a control signal of a certain amplitude is applied from limiter stage 34 to one filament section. The relay actuation level is indicated by a broken line in FIGURE 3, from which it appears that a current of about 4.25 milliamperes is required for relay actuation.

Curve V1 indicates the rise of plate current in a diode section when a control signal of reference amplitude is applied to its filament. "Reference amplitude" is here used to signify a signal of a level such that limiter stage 34 accomplishes amplitude regulation. In the presence of an applied signal of reference amplitude the elapsed time to attain the current level required for relay actuation is approximately 55 milliseconds. For the same condition of applied signal, it takes about 100 milliseconds for the diode section to reach its normal operating current, that is, saturation level.

Assuming that a signal of lesser amplitude is translated from limiter stage 34 and applied to the diode section, a lesser voltage appears across its filament and the heating time required to reach the relay-actuation current level is lengthened, as indicated by the intersection of curve V2 with the relay actuation line. For the assumed signal condition an interval of approximately 100 milliseconds is required to reach the diode current required for relay actuation.

For a signal of even lesser amplitude, such as that illustrated by curve V3 in FIGURE 3, it takes a longer time to effect relay operation; the elapsed time is approximately 175 milliseconds. For the initial condition (curve V1) where a control signal of reference amplitude is applied to the diode, a potential of approximately 2.2 volts appears across its filament. By way of comparison, when the applied signal is of the level depicted by curve V3, approximately 1.45 volts is applied across the filament. It has been found that the voltage appearing across the filament as a result of random noise and other transient disturbances picked up by microphone 21 generally does not exceed 1.1 volts, the level indicated by curve V4. The filament heating produced by such signal levels is not sufficient to achieve a plate current in the diode of more than two milliamperes, a value less than half that required to actuate a control relay. Even when the instantaneous peak value of the noise voltage is equal to that of a reference amplitude signal, as defined above, the diode current does not exceed the level indicated by curve V4. It is therefore manifest that the filamentary diode circuit of the invention requires the application of a signal which both exceeds a threshold amplitude level and also exceeds a minimum time duration before a plate current of sufficient magnitude to effect relay actuation is produced. It is also manifest that the integrating effect of the filaments militates against the undesirable actuation of any control relay in response to noise or other spurious signals.

From curve V1 in FIGURE 3, it is evident that relay actuation can be effected in substantially less than 100 milliseconds after a control signal of reference amplitude has been applied. The decay time of the diode current corresponds to the rise time as shown in curve V1. Accordingly, the total elapsed time for the attainment of the current level required for relay actuation and for the decay of this current is appreciably less than 200 milliseconds. For the type of operation normally effected by the remote control arrangement of the invention, an operational frequency in excess of five operations per second is not encountered. For example, at this operational frequency a 12-position VHF turret tuner can be driven through the maximum angular displacement between channel 2 and channel 13 in only 2.2 seconds. Accordingly, the rise and decay times of the filament emission in the diodes is sufficiently rapid to insure that the sensing and actuating effect of the filamentary diodes does not put any practical limitation on the rapidity of operation of the overall system.

In the normal operational environment of the invention the distance between the transmitting and receiving apparatus is sufficiently small so that a control signal of reference amplitude (e.g., curve V1 in FIGURE 3) is applied to a diode section, and this signal normally persists for at least 100 milliseconds; this is more than ample time for actuation of a control relay. For different environments, such as locations where a considerable amount of the ultrasonic energy is absorbed before reaching the receiver or where transmitter and receiver are separated by an unusually large space, it is apparent that a longer time ensues between issuance of the command signal and operation of the control relay (curves V2 and V3).

It is understood that the curves of FIGURE 3 are not given by way of limitation of the present invention but only by way of illustration. The curves are derived from an embodiment of the invention utilizing a diode manufactured by the General Electric Company under the interim designation Z2646. Those skilled in the art will doubless appreciate that other tubes may be used depending upon particular input signal levels and output requirements.

As shown by the very steep slope in the initial portion of the heating curves illustrated in FIGURE 3, and particularly by curve V1, the filamentary diode has, in effect, two opposed states of conductivity; (1) the condition of zero conduction or a degree of conduction that, as a practical matter, does not result in a diode current which can accomplish actuation of the control relay, and (2) a state of conduction that accomplishes actuation of the relay. The diode may be said to be normally maintained in its non-conductive state; reception of random noise signals does not raise the emission sufficiently to produce a significant output current in the diode. However, in response to application of a control signal of reference amplitude and the continued application of the signal beyond a minimum time duration, the diode is actuated to its conductive state and effects operation of the control relay.

That the circuit of the invention is substantially more economical than prior systems is evident. With the marked advantage of economy, the circuit of the invention is also extremely reliable in effecting swift and certain operation of a control relay in response to a control signal and simultaneously avoiding spurious operation when random noise or other transients are received at the input circuit.

While a particular embodiment of the invention has been shown and described, it will be obvious to those skilled in the art that changes and modifications may be made therein without departing from the invention in its broader aspects. The aim of the appended claim, therefore, is to cover all such changes and modifications as fall within the true spirit and scope of the invention.

I claim:

A remote control apparatus responsive to an unmodulated control signal of a predetermined frequency transmitted from a remote point and subject to being received along with undesired noise signals comprising: a receiver channel including a circuit receptive of said control signals, a limiter responsive to the received control signals to restrict the translated amplitude thereof to a preselected maximum value, a frequency selective circuit responsive only to signals of said predetermined frequency, a diode having a filamentary cathode with said cathode energized only by the amplitude-limited frequency-selected signals translated by the aforesaid limiter and circuits, said diode having a cathode emission characteristic responsive to the application to said cathode of an input signal of both a given minimum amplitude which is less than said preselected maximum value and a predetermined minimum time duration to develop a current flow of more than a predetermined magnitude, and a utilization circuit coupled to the anode of said diode and responsive only to current from said anode in excess of said predetermined magnitude.

References Cited in the file of this patent

UNITED STATES PATENTS

| | | |
|---|---|---|
| 1,471,756 | Schulte | Oct. 23, 1923 |
| 1,708,806 | Stone | Apr. 9, 1929 |
| 1,872,560 | Breisky | Aug. 16, 1932 |
| 2,128,750 | Kriebel | Aug. 30, 1938 |
| 2,677,014 | Moynihan | Apr. 27, 1954 |
| 2,838,668 | Adler et al. | June 10, 1958 |